(12) United States Patent
Marce et al.

(10) Patent No.: US 7,889,736 B2
(45) Date of Patent: Feb. 15, 2011

(54) IP COMMUNICATION NETWORK ROUTING PROTOCOL MESSAGE VALIDITY STATE SIGNALING DEVICE

(75) Inventors: Olivier Marce, Massy (FR); Damien Galand, Chaville (FR)

(73) Assignee: Alcatel, Paris (FR)

( * ) Notice: Subject to any disclaimer, the term of this patent is extended or adjusted under 35 U.S.C. 154(b) by 639 days.

(21) Appl. No.: 11/269,650

(22) Filed: Nov. 9, 2005

(65) Prior Publication Data

US 2006/0114880 A1 Jun. 1, 2006

(30) Foreign Application Priority Data

Nov. 10, 2004 (FR) .................................. 04 52596

(51) Int. Cl.
*H04L 12/28* (2006.01)

(52) U.S. Cl. ....................................... 370/392; 370/401

(58) Field of Classification Search ................. 370/351, 370/389, 392, 395.31, 395.3, 400, 401
See application file for complete search history.

(56) References Cited

U.S. PATENT DOCUMENTS

| | | | | |
|---|---|---|---|---|
| 6,700,874 B1 * | 3/2004 | Takihiro et al. | ............. | 370/248 |
| 6,728,782 B1 * | 4/2004 | D'Souza et al. | ............. | 709/242 |
| 7,181,533 B2 * | 2/2007 | D'Souza et al. | ............. | 709/242 |
| 7,342,897 B1 * | 3/2008 | Nader et al. | ................ | 370/255 |
| 7,388,869 B2 * | 6/2008 | Butehorn et al. | ............ | 370/401 |
| 2005/0201302 A1 * | 9/2005 | Gaddis et al. | ............... | 370/254 |
| 2007/0263553 A1 * | 11/2007 | Bharali et al. | ............... | 370/254 |

OTHER PUBLICATIONS

Kent Set al: "Secure Border Gateway Protocol (S-BGP)" IEEE Journal on Selected Areas in Communications, IEEE Inc. New York, US, vol. 18, No. 4, Apr. 2000, pp. 582-592.*
Olivier Bonaventure et al, "Controlling the redistribution of BGP routes", IETF Standard-Working-Draft, Internet Engineering Task Force , IETF, CH, vol. Grow, Apr. 2003, XP015001907.
Thomas Levy et al, Embedded BGP Routing Monitoring HSNMC 75H IEEE International Conference, Jun. 30, 2004, pp. 348-359, XP002332158.
A. Villamizar et al, "BGP Route Flap Damping", IETF Standard, Internet Engineering Task Force, IETF, CH, Nov. 1998, XP015008223.
Eric C. Rosen et al, "Using an LSA Options Bit to Prevent Looping in BCP,MPLS IP VPNs draft-ietf-ospf-2547-dnbit-00.txt", IETF Standard-Working-Draft, Internet Engineering Task Force, IETF, CH, vol. ospf, Jun. 2003, XP015002930.
T. G. Griffin et al, An Analysis of BGP Convergence Properties, Computer Communication Review, Association for Computing Machinery, NY, US, vol. 29, No. 4, Oct. 199, pp. 277-288, XP000852205.

* cited by examiner

*Primary Examiner*—Hong Cho
(74) *Attorney, Agent, or Firm*—Sughrue Mion, PLLC

(57) ABSTRACT

A device for processing routing protocol messages for a router of an Internet protocol communication network comprises a processor that determines if routing information contained in a routing protocol message to be sent to at least one destination peer router has been checked at least once by at least one routing checking tool, and the result of each check. It adds to the routing protocol message status information representing at least the result of each check effected on the message, with a view to sending it to the destination peer router.

22 Claims, 1 Drawing Sheet

IP COMMUNICATION NETWORK ROUTING PROTOCOL MESSAGE VALIDITY STATE SIGNALING DEVICE

CROSS-REFERENCE TO RELATED APPLICATIONS

This application is based on French Patent Application No. 0452596 filed Oct. 11, 2004, the disclosure of which is hereby incorporated by reference thereto in its entirety, and the priority of which is hereby claimed under 35 U.S.C. §119.

BACKGROUND OF THE INVENTION

1. Field of the Invention

The invention relates to Internet Protocol (IP) communication networks, and more particularly to checking the stability of IP networks.

2. Description of the Prior Art

The person skilled in the art knows that what is usually referred to as the Internet is a set of autonomous systems (AS) interconnected by IP routers and each consisting of one or more IP networks also interconnected by IP routers (also known as gateways).

Each autonomous system is generally under the control of a single Internet operator, in particular from the administrative point of view.

For data packets to be able to reach their destination, they must be routed in accordance with the services defined by service level agreements (SLA) between users who send them and operators. For these agreements to be complied with, the Internet network must have great stability, which is particularly difficult to achieve given that IP networks and the autonomous systems that constitute it change all the time and may malfunction.

To achieve a certain stability, Internet routers must constantly exchange routing information by means of routing protocols such as the Border Gateway Protocol (BGP), version 4 of which is defined by IETF standards RFC 1771 and 1772.

It is also essential to collect operating information within IP networks in order to adapt their functions to changing circumstances and to what is currently required and to verify the consistency of the routing information exchanged. There exist for this purpose routing checking tools, some of which are installed in the IP routers. These tools are in particular capable of determining if routing information contained in routing protocol messages received or to be sent is valid or invalid, that is to say sound or unsound. Now, regardless of the validity of routing information that has been checked one or more times, the routing information is transmitted to the destination peer router(s), without any distinction between information that is valid, invalid or merely unchecked. Invalid (or erroneous) information can therefore propagate through the whole or part of the Internet network, without distinction, compromising its stability.

Thus an object of the invention is to remedy this drawback.

SUMMARY OF THE INVENTION

To this end it proposes a device for processing routing protocol messages for a router of an Internet protocol communication network, the device comprising processing means that determine if routing information contained in a routing protocol message to be sent to a destination peer router has been checked at least once by at least one routing checking tool, and the result of each check, and add to the routing protocol message status information representing at least the result of each check effected thereon, with a view to sending it to the destination peer router(s).

For example, the status information may represent each check carried out on the routing information contained in the routing protocol message to be sent and the associated result. It may equally represent each tool used for each check applied to the routing information contained in a routing protocol message to be sent.

If the checking results indicate conformance of the routing data contained in a routing protocol message to be sent, the processing means may add thereto status information representing a certificate of conformance of the routing information that it contains.

The checks may be of any type, for example a check of paths between autonomous systems (AS), a traffic distribution policy check, and an autonomous system (AS) aggregation optimality check.

The processing means of the device of the invention preferably also receive and generate the routing protocol messages.

Furthermore, the processing means may process routing protocol messages of any kind, in particular messages taking the form of routing information update messages, for example of the BGP type.

Furthermore, in the event of checking results indicating non-conformance of routing information contained in a routing protocol message to be sent, the processing means may decline to send the message.

The invention also proposes an IP router equipped with a processing device of the type described hereinabove.

This router may also comprise checking means including the routing checking tools and connected to the processing device.

BRIEF DESCRIPTION OF THE DRAWING

Other features and advantages of the invention will become apparent on reading the following detailed description and examining the appended drawing, FIG. 1 showing a diagram of a portion of one embodiment of an Internet network equipped with IP routers of the invention. The appended drawing constitutes part of the description of the invention as well as contributing to the definition of the invention, if necessary.

DETAILED DESCRIPTION OF THE PREFERRED EMBODIMENT

Figure 1:
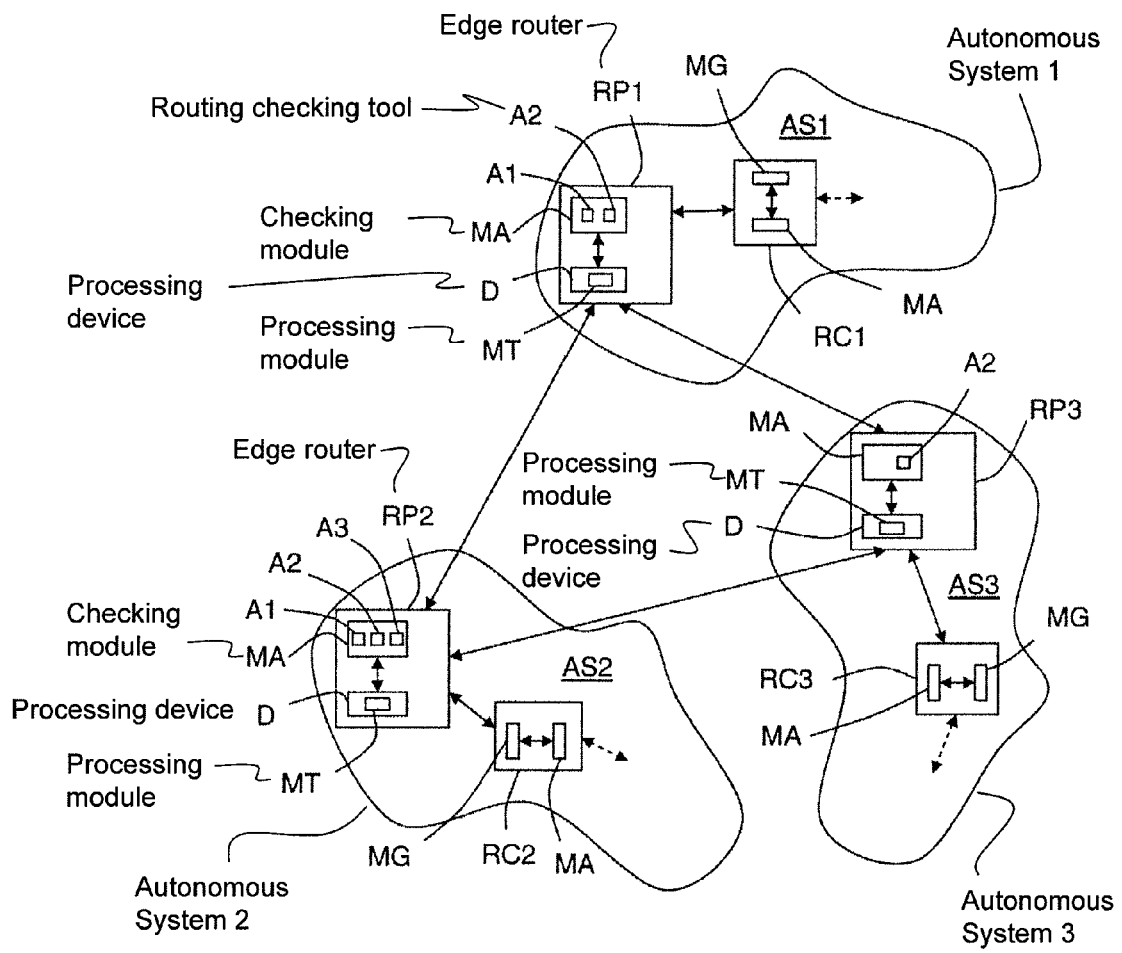

An object of the invention is to enable signaling to the routers of an Internet network the validity of routing information contained in routing protocol messages.

As indicated in the introduction, broadly speaking, but nevertheless in sufficient detail for the invention to be understood, an Internet network may be summarized as a set of autonomous systems ASi interconnected by IP edge routers RPi.

In the example shown in the single FIGURE, the value of the suffix i is from 1 to 3, but it may take any value greater than or equal to 1.

Additionally, although this is not shown in the FIGURE, each autonomous system ASi consists of one or more Internet Protocol (IP) communication networks interconnected by IP edge routers and connected to other edge routers and core routers RCi.

Conventionally, the routers RPi and RCi generate and exchange routing protocol messages containing routing information, for example the identifiers of routers that they know, the addresses that they can reach and any associated cost metrics, and the paths between autonomous systems (i.e. the routes defined by the network administrator as a function of agreements between the operators controlling the autonomous systems ASi).

It is considered hereinafter, by way of nonlimiting example, that the routers use the Border Gateway Protocol (BGP) routing protocol, for example version 4 thereof, which is defined by IETF standards RFC 1771 and 1772, to exchange routing protocol messages. However, the invention relates to any type of "interdomain" routing protocol. Hereinafter a routing protocol message is referred to as a "BGP message".

Each router RPi, RCi includes a BGP message management module MGM which in some cases constitutes one of the functions of a processing module MT (see below). Each router RPi, RCi also includes a checking module MA connected to its BGP message management module MGM and comprising one or more routing applications (or tools) Aj for performing data processing and selected routing checks, for example checks on paths between autonomous systems (AS), or load balancing policy checks, or prefix aggregation optimality checks, or absence of instability checks. A checking module MA can use any type of checking application Aj.

The routing checking applications (or tools) Aj may be installed in systems external to the routers. In this case, the checking module MA is replaced by a communicating module that sends messages received to the external checking module and receives results from the checking applications.

As shown in FIG. 1, the number of routing checking applications Aj contained in a checking module MA may vary from one router to another. For example, the router RP1 comprises two routing checking applications (or tools) A1 and A2, the router RP2 comprises three routing checking applications (or tools) A1, A2 and A3, and the router RP3 comprises one routing checking application (or tool) A2.

The checking module MA includes, for example, routing tables and BGP tables including in particular the routing information resulting from the processing and checking carried out by its applications Aj.

Each management module MGM communicates to the applications Aj of the associated checking module MA the routing information that is contained in the BGP messages received by the router RPi, RCi in which it is installed, in order for said applications to be able to perform their respective checking and processing and to update the routing tables and the BGP tables.

Moreover, each management module MGM is responsible for integrating into BGP messages the routing information that is sent to it by the associated checking module MA, in order for it to be sent to one or more destination routers RPi, RCi.

According to the invention, at least one of the edge routers RPi, and preferably all the routers RPi and RCi of the Internet network, comprise a processing device D coupled to the analysis module MA and including a processing module MT implementing the function of the management module MGM and responsible, each time that it is required to send a BGP message to at least one destination peer router RPi, RCi, for determining if the routing information that it contains has been checked at least once by at least one routing checking application (or tool) Aj of the checking module MA, as well as the result of each check.

To this end, the processing module MT can interrogate the analysis module MA to determine from its applications Aj which checks have been carried out and the results thereof.

Once the processing module MT has information relating to the checks carried out on the routing information of a BGP message to be transmitted, and the results thereof, it can generate status information representing at least the result of each check that has been performed and is intended to be integrated by the processing module MT into said BGP message before it is sent to the destination peer router(s).

This status information is arranged as a data structure, for example, which may be integrated into the "option" field of the BGP message to be sent, for example, in particular if the BGP message is an update message.

Any type of status information representing the results of checks may be integrated into a BGP message, such as validity or invalidity information designating routing information and where applicable associated with each type of check used to obtain that validity information and/or each application (or tool) Aj used. However, it may equally consist of a kind of certificate of conformance (or non-conformance) or of validity (or invalidity) that is generated by the processing module MT if all the results of the various checks indicate the conformance (or non-conformance) of a portion at least of the routing information that is contained in a BGP message to be sent.

A router RPi can decline to send a routing protocol message if it realizes that the check result(s) indicate(s) that routing information contained in the message to be sent is non-conform.

If a router RPi receives a BGP message containing routing information status information, its processing module MT (which implements the function of the management module MGM) analyzes the information and can, for example, decide to send to the checking module MA only valid routing information.

If the status information contained in a BGP message amounts to a certificate of invalidity, the processing module MT may transmit to the checking module MA only the routing information contained in that BGP message.

Of course, a variant that is valid in the above two situations may be envisaged in which the processing module MT sends to the checking module MA the routing information and the associated status information contained in the received BGP message, in order for said checking module MA to decide for itself what it must do with this routing information, given the associated status information.

The processing device D of the invention, and in particular its processing module MT, may take the form of electronic circuits, software (or electronic data processing) modules, or a combination of circuits and software.

The invention is not limited to the processing device and IP router embodiments described hereinabove by way of example only, and encompasses any variant that the person skilled in the art might envisage that falls within the scope of the following claims.

There is claimed:

1. A device for processing routing protocol messages for a router of an Internet protocol communication network comprising:
   at least one routing checking tool; and
   processing means;
      wherein the processing means determine if a validity of routing information contained in a routing protocol message to be sent to a destination peer router has been checked at least once by the at least one routing checking tool,
      wherein the processing means determine a result of each validity check, and wherein the processing means add to said routing protocol message status information representing at least the result of each validity check effected thereon and send said routing protocol message comprising said status information to said destination peer router.

2. The device according to claim 1, wherein said status information represents each validity check carried out on the routing information contained in a routing protocol message to be sent and the associated result.

3. The device according to claim 2, wherein said status information represents each tool used for each validity check applied to the routing information contained in a routing protocol message to be sent.

4. The device claimed in claim 3 wherein, in the event of checking results indicating conformance or non-conformance of the routing data contained in a routing protocol message to be transmitted, said processing means add thereto status information representing a certificate of conformance or of non-conformance of said routing information that the routing protocol message contains.

5. The device according to claim 3, wherein said validity checks are selected from a group including a check of paths between autonomous systems, a traffic distribution policy check, and an autonomous system aggregation optimality check.

6. A router for an Internet protocol communication network, comprising a device according to claim 3.

7. The device claimed in claim 2 wherein, in the event of checking results indicating conformance or non-conformance of the routing data contained in a routing protocol message to be transmitted, said processing means add thereto status information representing a certificate of conformance or of non-conformance of said routing information that the routing protocol message contains.

8. The device according to claim 2, wherein said validity checks are selected from a group including a check of paths between autonomous systems, a traffic distribution policy check, and an autonomous system aggregation optimality check.

9. The device claimed in claim 2 wherein said processing means receive and generate said routing protocol messages.

10. The device according to claim 2, wherein said processing means process routing protocol messages taking the form of routing information update messages.

11. The device according to claim 2, wherein said routing protocol messages are of BGP type.

12. A router for an Internet protocol communication network, comprising a device according to claim 2.

13. The device claimed in claim 1 wherein, in the event of checking results indicating conformance or non-conformance of the routing data contained in a routing protocol message to be transmitted, said processing means add thereto status information representing a certificate of conformance or of non-conformance of said routing information that the routing protocol message contains.

14. The device according to claim 13, wherein said validity checks are selected from a group including a check of paths between autonomous systems, a traffic distribution policy check, and an autonomous system aggregation optimality check.

15. A router for an Internet protocol communication network, comprising a device according to claim 13.

16. The device according to claim 1, wherein said validity checks are selected from a group including a check of paths between autonomous systems, a traffic distribution policy check, and an autonomous system aggregation optimality check.

17. The device claimed in claim 1, wherein said processing means receive and generate said routing protocol messages.

18. The device according to claim 1, wherein said processing means process routing protocol messages taking the form of routing information update messages.

19. The device according to claim 1, wherein said routing protocol messages are of BGP type.

20. A router for an Internet protocol communication network, comprising a device according to claim 1.

21. The router according to claim 20, comprising checking means connected to said device and including said routing checking tools.

22. The device claimed in claim 1, wherein the routing protocol message is sent by the router to the destination peer router.

* * * * *